(12) United States Patent
Matsumoto (10) Patent No.: US 7,596,009 B2
(45) Date of Patent: Sep. 29, 2009

(54) DOUBLE-ENDED ISOLATED DC-DC CONVERTER

(75) Inventor: Tadahiko Matsumoto, Otsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/399,157

(22) Filed: Mar. 6, 2009

(65) Prior Publication Data

US 2009/0161391 A1 Jun. 25, 2009

Related U.S. Application Data

(63) Continuation of application No. PCT/JP2007/063714, filed on Jul. 10, 2007.

(30) Foreign Application Priority Data

Oct. 2, 2006 (JP) .............................. 2006-270976

(51) Int. Cl.
*H02M 7/68* (2006.01)
(52) U.S. Cl. .............................. 363/89; 363/127; 363/25
(58) Field of Classification Search ............. 363/84–89, 363/127, 126, 25, 26
See application file for complete search history.

(56) References Cited

U.S. PATENT DOCUMENTS

| | | | |
|---|---|---|---|
| 5,519,559 A | 5/1996 | Dides et al. | |
| 5,907,481 A * | 5/1999 | Svardsjo | 363/25 |
| 6,069,802 A * | 5/2000 | Priegnitz | 363/21.06 |
| 6,111,769 A | 8/2000 | Zhang et al. | |
| 6,185,114 B1 * | 2/2001 | Matsumoto et al. | 363/21.06 |
| 6,459,600 B2 * | 10/2002 | Farrington et al. | 363/89 |
| 6,650,552 B2 * | 11/2003 | Takagi et al. | 363/17 |

FOREIGN PATENT DOCUMENTS

| | | |
|---|---|---|
| JP | 57-118616 A | 7/1982 |
| JP | 2001-069756 A | 3/2001 |
| JP | 2003-511004 A | 3/2003 |
| JP | 2004-032855 A | 1/2004 |

OTHER PUBLICATIONS

Official Communication issued in International Patent Application No. PCT/JP2007/063714, mailed on Oct. 16, 2007.

* cited by examiner

*Primary Examiner*—Rajnikant B Patel
(74) *Attorney, Agent, or Firm*—Keating & Bennett, LLP (57) ABSTRACT

In a double-ended isolated DC-DC converter, by using a main transformer and first and second pulse transformers, a first power switch of a primary side circuit and a first synchronous rectifier of a secondary side circuit are driven with complementary timing, and a second power switch of the primary side circuit and a second synchronous rectifier of the secondary side circuit are driven with complementary timing. A first turn-off edge signal and a first turn-on edge signal generated in a primary side control circuit are transmitted to the secondary side via the first pulse transformer so as to generate a driving signal of the first synchronous rectifier. In addition, a second turn-off edge signal and a second turn-on edge signal generated in a primary side circuit are transmitted to the secondary side via the second pulse transformer so as to generate a driving signal of the second synchronous rectifier.

7 Claims, 7 Drawing Sheets

DOUBLE-ENDED ISOLATED DC-DC CONVERTER

BACKGROUND OF THE INVENTION

1. Field of the Invention

The present invention relates to a double-ended isolated DC-DC converter, such as a half bridge DC-DC converter, a push-pull DC-DC converter, or a full bridge DC-DC converter.

2. Description of the Related Art

Figure 1:
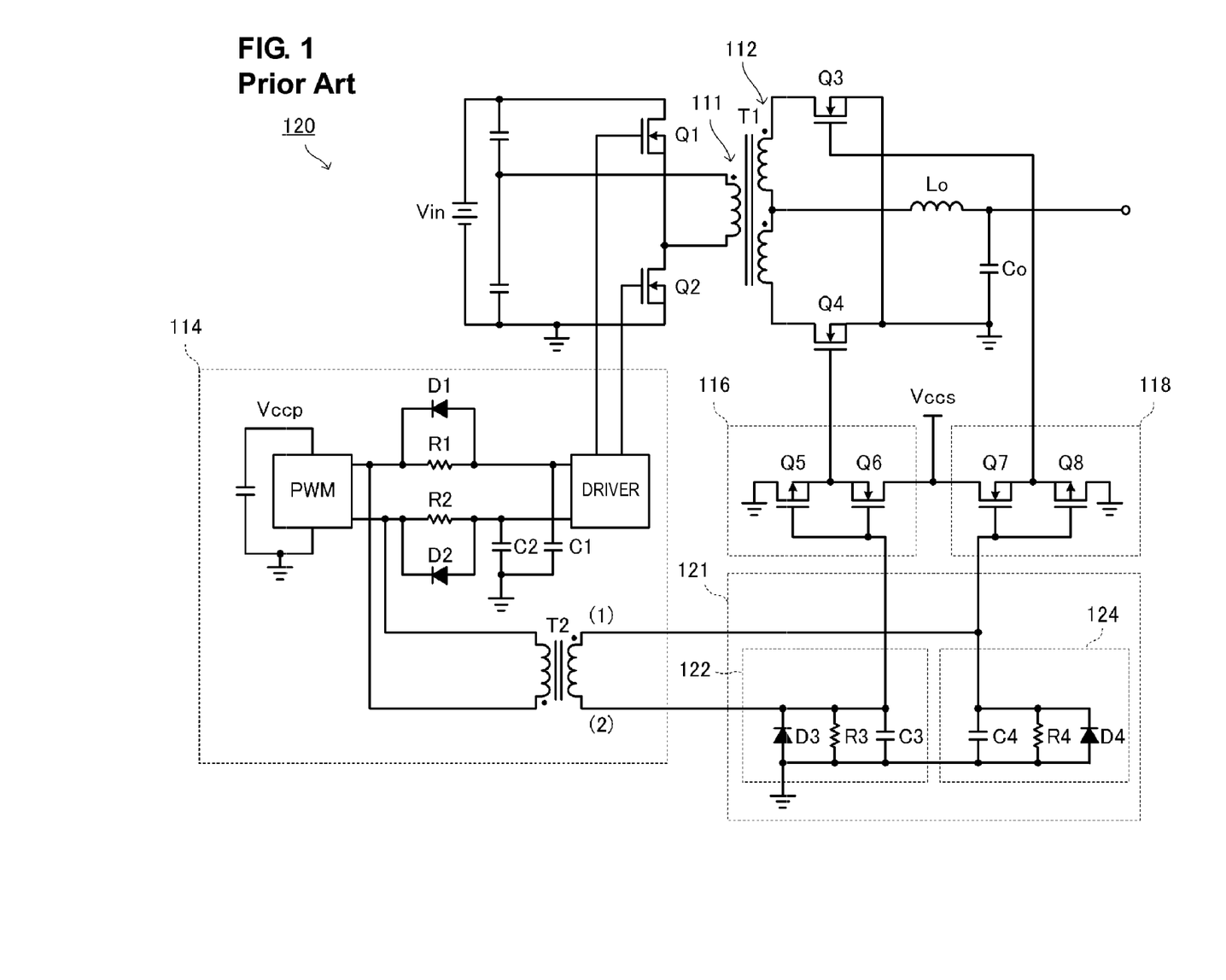
FIG. 1 is a circuit diagram of a double-ended isolated DC-DC converter described in the related art.

FIG. 1 illustrates an example of an existing double-ended isolated DC-DC converter. A double-ended isolated DC-DC converter 120 includes an external drive circuit 114, totem-pole drivers 116 and 118, a DC level shifter 121, a first switch driver 122, a second switch driver 124, primary side switches Q1 and Q2, a main transformer T1, a signal transmission transformer T2, a first synchronous rectifier Q3, a second synchronous rectifier Q4, a first switch Q5, a second switch Q6, a third switch Q7, a fourth switch Q8, a choke coil Lo, an output smoothing capacitor Co, resistors R1, R2, R3, and R4, capacitors C1, C2, C3, and C4, and diodes D1, D2, D3, and D4.

In the double-ended isolated DC-DC converter shown in FIG. 1, when a direct current voltage is applied from an input direct current power supply Vin, the primary side switches Q1 and Q2 alternately perform a switching operation. Thus, the direct current power is converted into alternating current power. The alternating current power is transmitted from a primary side circuit to a secondary side circuit of the main transformer T1 by the main transformer T1. The alternating current power is then rectified by the first synchronous rectifier Q3 and the second synchronous rectifier Q4. Thereafter, the alternating current power is smoothed by the choke coil Lo and the output smoothing capacitor Co and is converted into a direct current again. A feedback circuit (not shown) detects an output voltage and generates an error signal by comparing the output voltage with a reference voltage. The feedback circuit then transmits the error signal from the secondary side circuit to the primary side circuit. A PWM control circuit outputs first and second PWM signals. The rise of the first PWM signal is delayed by the diode D1, the resistor R1, and the capacitor C1, while the rise of the second PWM signal is delayed by the diode D2, the resistor R2, and the capacitor C2. Subsequently, the first and second PWM signals are input to the corresponding drivers. The drivers generate gate drive signals of the primary side switches Q1 and Q2 based on the input signals. At the same time, the first and second PWM signals are input to the signal transmission transformer T2 so that a combined signal of the first PWM signal appearing at a first pole of a transformer coil voltage and the second PWM signal appearing at a second pole of a transformer coil voltage is generated. The synthesis signal is transmitted to the secondary side circuit. The transmitted synthesis signal is applied to the DC level shifter 121. Thus, the DC levels of driving voltages of the totem-pole drivers 116 and 118 are increased. Accordingly, the ON period of the totem-pole drivers 116 and 118 is increased. As a result, the first synchronous rectifier Q3 and the second synchronous rectifier Q4 are driven at a timing substantially complementary to that of the primary side switches Q1 and Q2.

A conventional double-ended isolated DC-DC converter similar to that shown in FIG. 1 is disclosed in Japanese Unexamined Patent Application Publication No. 2003-511004.

In the existing double-ended isolated DC-DC converter shown in FIG. 1, since the first synchronous rectifier Q3 and the second synchronous rectifier Q4 are driven at a timing substantially complementary to that of the primary side switches Q1 and Q2, there is no period of time for a secondary coil output current of the main transformer T1 to flow through a parasitic diode of the synchronous rectifier. In addition, a short-circuited current caused by a shift of a synchronous rectifier driving timing is not generated. Accordingly, a highly efficient power conversion operation can be provided.

However, in the existing double-ended isolated DC-DC converter shown in FIG. 1, since the first and second PWM signals are combined in the primary side circuit and are separated in the secondary side circuit, a combining/separating circuit is required. Accordingly, the circuit configuration is disadvantageously complicated. Since the signal transmission transformer T2 needs to transmit a signal at a switching frequency (several tens of kHz), a relatively high inductance of 100 µH or more is required, for example. Therefore, the size of the signal transmission transformer T2 is increased. Thus, it is difficult to reduce the size and weight of the converter.

SUMMARY OF THE INVENTION

To overcome the problems described above, preferred embodiments of the present invention provide a compact and lightweight double-ended isolated DC-DC converter that maintains a highly efficient power conversion by driving switches on a primary side and a synchronous rectifier on a secondary side with substantially complementary timing.

According to a preferred embodiment of the present invention, a double-ended isolated DC-DC converter includes a main transformer including at least a primary coil and a secondary coil, first and second power switches connected to the primary side of the main transformer, a primary side control circuit arranged to control switching operations of the first and second power switches, first and second synchronous rectifiers connected to the secondary side of the main transformer, at least one choke coil, a first edge signal generating circuit arranged to generate, based on a signal output from the primary side control circuit, a first turn-off edge signal and a first turn-on edge signal substantially corresponding to timing of turn-on and turn-off of the first power switch, respectively, a second edge signal generating circuit arranged to generate, based on a signal output from the primary side control circuit, a second turn-off edge signal and a second turn-on edge signal substantially corresponding to timing of turn-on and turn-off of the second power switch, respectively, a first pulse transformer arranged to transmit the first turn-off edge signal and the first turn-on edge signal to the secondary side, a second pulse transformer arranged to transmit the second turn-off edge signal and the second turn-on edge signal to the secondary side, a first synchronous rectifier control circuit arranged to turn off the first synchronous rectifier in response to the first turn-off edge signal transmitted from the first pulse transformer and to turn on the first synchronous rectifier in response to the first turn-on edge signal transmitted from the first pulse transformer, and a second synchronous rectifier control circuit arranged to turn off the second synchronous rectifier in response to the second turn-off edge signal transmitted from the second pulse transformer and to turn on the second synchronous rectifier in response to the second turn-on edge signal transmitted from the second pulse transformer. The first power switch and the first synchronous rectifier are driven with substantially complementary timing, and the second power switch and the second synchronous rectifier are driven with substantially complementary timing.

The primary side control circuit can preferably have a delaying characteristic so that turn-on of the first power switch lags behind turn-off of the first synchronous rectifier after the first turn-off edge signal is generated, and turn-on of the second power switch lags behind turn-off of the second synchronous rectifier after the second turn-off edge signal is generated.

The double-ended isolated DC-DC converter can preferably further include a first synchronous rectifier side delay circuit arranged to cause turn-on of the first synchronous rectifier to lag behind turn-off of the first power switch after the first turn-on edge signal is generated and a second synchronous rectifier side delay circuit arranged to cause turn-on of the second synchronous rectifier to lag behind turn-off of the second power switch after the first turn-on edge signal is generated.

The first synchronous rectifier side delay circuit can preferably include a delay time control circuit arranged to detect variations in at least one of a drain voltage of the first synchronous rectifier, a coil voltage of the main transformer, and a voltage of the choke coil and stop the delaying operation when the drain voltage of the first synchronous rectifier is changed, and the second synchronous rectifier side delay circuit can include a second delay time control circuit arranged to detect variations in at least one of a drain voltage of the second synchronous rectifier, a coil voltage of the main transformer, and a voltage of the choke coil and stop the delaying operation when the drain voltage of the second synchronous rectifier is changed.

The second power switch can preferably be a high side switch having a reference potential disconnected from the ground, and the primary side control circuit can include a circuit that turns on the second power switch in response to the second turn-off edge signal and turns off the second power switch in response to the second turn-on edge signal.

The main transformer and the first and second pulse transformers can preferably be defined by a pair of cores and coils independent from each other so as to make a composite transformer that equivalently functions as the individual independent transformers.

More specifically, the pair of cores can preferably include a middle leg and at least one pair of outer legs facing each other with the middle leg arranged therebetween so as to define a closed magnetic circuit, and the coils can include a first coil set including at least two coils wound around the middle leg, a second coil set including two coils, wherein one of the pair of outer legs is separated into two outer leg portions with a space therebetween that allows a coil to be wired therein and each of the two coils is wound around the corresponding one of the two outer leg portions in opposite winding directions, and a third coil set including two coils, wherein the other outer leg is separated into two outer leg portions with a space therebetween that allows a coil to be wired and each of the two coils is wound around the corresponding one of the two outer leg portions in opposite winding directions. The first coil set and the pair of cores define the main transformer, the second coil set and the pair of cores define the first pulse transformer, and the third core set and the pair of cores define the second pulse transformer.

Preferred embodiments of the present invention provide the following advantages.

Since the first and second pulse transformers transmit pulse edge signals instead of a switching frequency signal, the first and second pulse transformers only needs to have a low inductance of, for example, several µH. By using the compact pulse transformers, the size and weight of the double-ended isolated DC-DC converter can be reduced.

After the first turn-off edge signal is generated, the primary side control circuit causes turn-on of the first power switch to lag behind turn-off of the first synchronous rectifier using the delay characteristic thereof. In addition, after the second turn-off edge signal is generated, turn-on of the second power switch lags behind turn-off of the second synchronous rectifier. Accordingly, a short circuit that occurs when the first power switch and the first synchronous rectifier are simultaneously turned on and a short circuit that occurs when the second power switch and the second synchronous rectifier are simultaneously turned on can be prevented.

After the first turn-on edge signal is generated, the first synchronous rectifier side delay circuits operate to cause turn-on of the first synchronous rectifier to lag behind turn-off of the first power switch. In addition, the second synchronous rectifier side delay circuits operate to cause turn-on of the second synchronous rectifier to lag behind turn-off of the second power switch. Accordingly, a short circuit that occurs when the first power switch and the first synchronous rectifier are simultaneously turned on and a short circuit that occurs when the second power switch and the second synchronous rectifier are simultaneously turned on can be prevented.

The first delay time control circuit operates so as to detect variations in at least one of a drain voltage of the first synchronous rectifier, a coil voltage of the main transformer, and a voltage of the choke coil and stop the delaying operation when the drain voltage of the first synchronous rectifier is changed. In addition, the second delay time control circuit operates so as to detect variations in at least one of a drain voltage of the second synchronous rectifier, a coil voltage of the main transformer, and a voltage of the choke coil and to stop the delaying operation when the drain voltage of the second synchronous rectifier is changed. Accordingly, if a back-flow current having a magnitude of a predetermined value or more flows in the first and second synchronous rectifiers, the first and second delay time control circuits operate so as to increase the delay time. Thus, the turn-on timing of the first and second synchronous rectifiers is delayed, and therefore, the back-flow current can be limited. That is, although the converter uses a synchronous rectifier, a back-flow operation mode can be prevented.

The second power switch is a high side switch having a reference potential disconnected from the ground, and the primary side control circuit includes the circuit that turns on the second power switch using the second turn-off edge signal and turns off the second power switch using the second turn-on edge signal. Accordingly, a high side driver is not required, and therefore, the total cost of the components can be advantageously reduced.

Since the first and second pulse transformers transmit pulse edge signals, instead of signals of a switching frequency, the first and second pulse transformers only need to have a low inductance of, for example, several µH. If a planar magnetic path core is used, the first and second pulse transformers can be defined by only one or two turns. Accordingly, by forming the main transformer and the first and second pulse transformers into a composite transformer in which a pair of cores and independent coils equivalently function as independent transformers, these transformers can be a composite transformer without degrading the characteristics of the main transformer. In a circuit diagram, there are preferably three transformers provided. However, the three transformers can be integrated into one body. Therefore, in practice, the converter preferably includes only one transformer. As a result, the size and the manufacturing cost of the converter can be reduced.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

Figure 2:
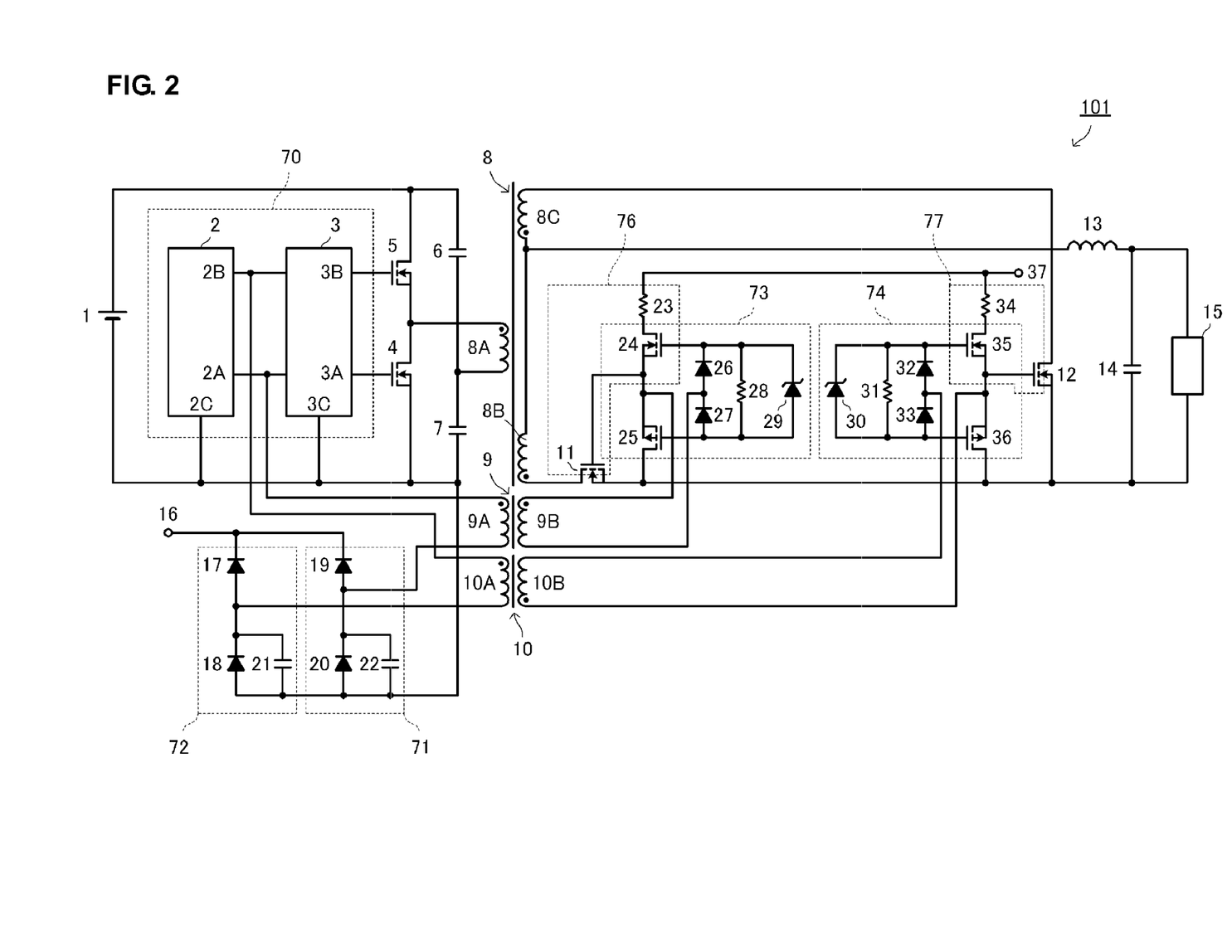
FIG. 2 is a circuit diagram of a double-ended isolated DC-DC converter according to a first preferred embodiment of the present invention.
Figure 3:
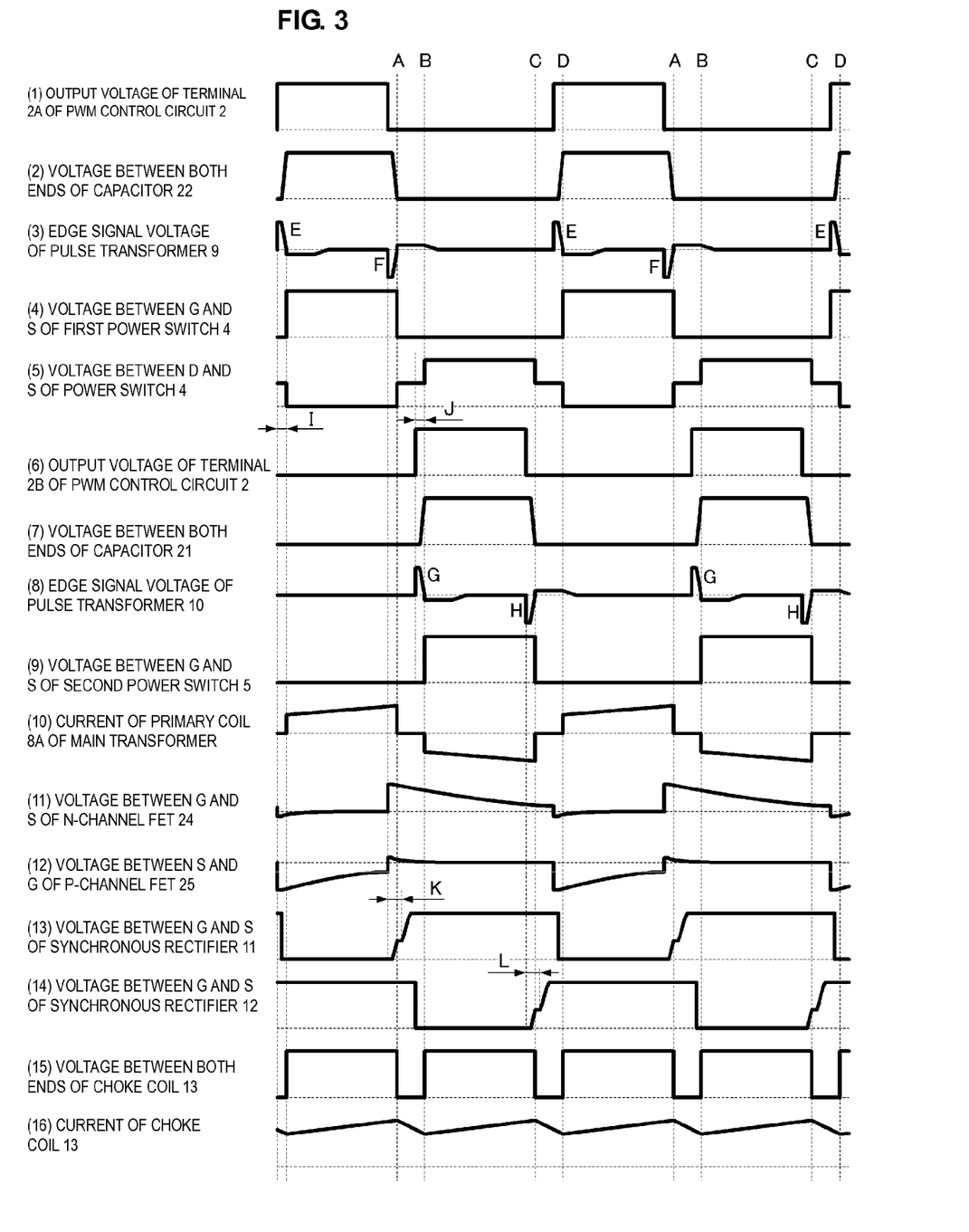
FIG. 3 is a waveform diagram of the voltage and current of a main portion of the double-ended isolated DC-DC converter shown in FIG. 2.

FIG. 2 is a circuit diagram of a double-ended isolated DC-DC converter according to a first preferred embodiment of the present invention. FIG. 3 is a waveform diagram of the main portion of the double-ended isolated DC-DC converter. FIGS. 4A to 4D are diagrams illustrating the structure of a transformer used in the first preferred embodiment.

As shown in FIG. 2, a double-ended isolated DC-DC converter 101 includes a main transformer 8 having a primary coil 8A and a secondary coil 8B, a first power switch 4 and a second power switch 5 connected to the primary side of the main transformer 8, a primary side control circuit 70 arranged to control switching operations of the first power switch 4 and the second power switch 5. The double-ended isolated DC-DC converter 101 further includes a first synchronous rectifier 11, a second synchronous rectifier 12, and a choke coil 13 connected to a secondary side of the main transformer 8.

The double-ended isolated DC-DC converter 101 further includes a first edge signal generating circuit 71 and a second edge signal generating circuit 72. The first edge signal generating circuit generates a first turn-off edge signal and a first turn-on edge signal at timing substantially corresponding to the timing of a turn-on operation and a turn-off operation of the first power switch 4, respectively, in response to a signal received from the primary side control circuit 70. The second edge signal generating circuit 72 generates a second turn-off edge signal and a second turn-on edge signal at timing substantially corresponding to the timing of a turn-on operation and a turn-off operation of the second power switch 5, respectively, in response to the signal received from the primary side control circuit 70.

The double-ended isolated DC-DC converter 101 further includes a first pulse transformer 9 arranged to transmit the first turn-off edge signal and the first turn-on edge signal to the secondary side, a second pulse transformer 10 arranged to transmit the second turn-off edge signal and the second turn-on edge signal to the secondary side, and a first synchronous rectifier control circuit 73 that turns off the first synchronous rectifier 11 in response to the first turn-off edge signal (refer to "E" in FIG. 3 described below) transmitted from the first pulse transformer 9 and turns on the first synchronous rectifier 11 in response to the first turn-on edge signal (refer to "F" in FIG. 3) transmitted from the first pulse transformer 9. The double-ended isolated DC-DC converter 101 further includes a second synchronous rectifier control circuit 74 that turns off the second synchronous rectifier 12 in response to the second turn-off edge signal (refer to "G" in FIG. 3) transmitted from the second pulse transformer 10 and turns on the second synchronous rectifier 12 in response to the second turn-on edge signal (refer to "H" in FIG. 3) transmitted from the second pulse transformer 10.

A series circuit of the first power switch 4 and the second power switch 5 and a series circuit of capacitors 6 and 7 are connected between lines of an input DC power supply 1. The primary coil 8A of the main transformer 8 is connected between a connection point between the first power switch 4 and the second power switch 5 and a connection point between the capacitors 6 and 7.

One end of the choke coil 13 is connected to a connection point between the secondary coils 8B and 8C of the main transformer 8. An output smoothing capacitor 14 is connected between the other end of the choke coil 13 and the ground on the secondary side.

The first synchronous rectifier 11 is connected between one end of the secondary coil 8B of the main transformer 8 and the ground on the secondary side. In addition, the second synchronous rectifier 12 is connected between one end of the secondary coil 8C of the main transformer 8 and the ground on the secondary side.

The primary side control circuit 70 includes a PWM control circuit 2 and a high side driver 3. A first PWM signal output terminal 2A and a second PWM signal output terminal 2B are connected to the high side driver 3. A first power switch drive terminal 3A of the high side driver 3 is connected to a gate of the first power switch 4, whereas a second power switch drive terminal 3B of the high side driver 3 is connected to a gate of the second power switch 5. A ground terminal 2C of the PWM control circuit 2 and a ground terminal 3C of the high side driver 3 are connected to the ground on the primary side.

The input DC power supply 1 is connected to the input of the double-ended isolated DC-DC converter 101, whereas a load 15 is connected to the output of the double-ended isolated DC-DC converter 101. In addition, a control power supply voltage is applied to a primary-side control circuit power input unit 16.

The first edge signal generating circuit 71 includes schottky barrier diodes (hereinafter referred to as "SBDs") 19 and 20 and a capacitor 22. The first edge signal generating circuit 71 is connected between the primary-side control circuit power input unit 16 and the ground on the primary side. Similarly, the second edge signal generating circuit 72 includes SBDs 17 and 18 and a capacitor 21. The second edge signal generating circuit 72 is connected between the primary-side control circuit power input unit 16 and the ground on the primary side.

A primary coil 9A of the first pulse transformer 9 is connected between the first PWM signal output terminal 2A of the PWM control circuit 2 and the first edge signal generating circuit 71. Similarly, a primary coil 10A of the second pulse transformer 10 is connected between the second PWM signal output terminal 2B of the PWM control circuit 2 and the second edge signal generating circuit 72.

The first synchronous rectifier control circuit 73 includes an N-channel MOSFET 24, a P-channel MOSFET 25, diodes (PN diodes) 26 and 27, a zener diode 29, and a resistor 28. Similarly, the second synchronous rectifier control circuit 74 includes an N-channel MOSFET 35, a P-channel MOSFET 36, diodes (PN diodes) 32 and 33, a zener diode 30, and a resistor 31.

A series circuit of the FET 24, the FET 25, and a resistor 23 is connected between a secondary-side control circuit power input unit 37 and the ground on the secondary side. A connection point between the FET 24 and the FET 25 is connected to a gate of an N-channel MOSFET serving as the first synchronous rectifier 11. Similarly, a series circuit of the FET 35, the FET 36, and a resistor 34 is connected between the secondary-side control circuit power input unit 37 and the ground on the secondary side. A connection point between the FET 35 and the FET 36 is connected to a gate of an N-channel MOSFET serving as the second synchronous rectifier 12.

In addition, as shown in FIG. 2, a secondary coil 9B of the first pulse transformer 9 is connected between a connection point between the diodes 26 and 27 of the first synchronous rectifier control circuit 73 and the connection point between the FETs 24 and 25. Similarly, a secondary coil 10B of the second pulse transformer 10 is connected between a connection point between the diodes 32 and 33 of the second synchronous rectifier control circuit 74 and the connection point between the FETs 35 and 36.

The circuit operation in FIG. 2 is described below with reference to the waveform shown in FIG. 3. In FIG. 3, the reference symbols are defined as follows:

A: off timing of the first power switch 4;
B: on timing of the second power switch 5;
C: off timing of the second power switch 5;
D: on timing of the first power switch 4;
E: a first turn-off edge signal;
F: a first turn-on edge signal;
G: a second turn-off edge signal;
H: a second turn-on edge signal;
I: a first delay time (a period of time between generation of the first turn-off edge signal E and turn-on of the first power switch);
J: a second delay time (a period of time between generation of the second turn-off edge signal G and turn-on of the second power switch);
K: a third delay time (a period of time between reception of the first turn-on edge signal F and turn-on of the first synchronous rectifier); and
L: a fourth delay time (a period of time between reception of the second turn-on edge signal H and turn-on of the second synchronous rectifier).

The double-ended isolated DC-DC converter 101 shown in FIG. 2 is a half-bridge converter. The on-duty of the first power switch 4 is substantially the same as that of the second power switch 5. As the on-duty of the first power switch 4 is decreased, the on-duty of the second power switch 5 is decreased. The first power switch 4 and the first synchronous rectifier 11 are driven with substantially complementary timing. In addition, the second power switch 5 and the second synchronous rectifier 12 are driven with substantially complementary timing.

When a direct current is applied from the input DC power supply 1, the first power switch 4 and the second power switch 5 alternately perform a switching operation so that the direct current is converted into an alternating current. The alternating current is transmitted from the primary side circuit to the secondary side circuit of the main transformer 8. The alternating current is then rectified by the first synchronous rectifier 11 and the second synchronous rectifier 12. Thereafter, the alternating current is smoothed by the choke coil 13 and the output smoothing capacitor 14 and is converted into a direct current again. The direct current is supplied to the load 15.

A feedback circuit (not shown) detects an output voltage and generates an error signal by comparing the output voltage with a reference voltage. The feedback circuit then transmits the error signal from the secondary side circuit to the primary side circuit. The PWM control circuit 2 outputs first and second PWM signals subjected to pulse width control. The first PWM signal is output from the first PWM signal output terminal 2A and is input to the high side driver 3. The first PWM signal is then output from the first power switch drive terminal 3A of the high side driver 3. The second PWM signal is output from the second PWM signal output terminal 2B and is converted, by the high side driver 3, into a signal that can drive the high side switch having a reference potential (a source potential) disconnected from the ground. The second PWM signal is then output from the second power switch drive terminal 3B.

When the first PWM signal output from the terminal 2A of the PWM control circuit 2 rises (refer to (1) in FIG. 3), the capacitor 22 is charged via the primary coil 9A of the first pulse transformer 9 (refer to (2) in FIG. 3). Thus, the first turn-off edge signal E is generated in the first pulse transformer 9 (refer to (3) in FIG. 3).

The first turn-off edge signal E is transmitted from the primary coil 9A to the secondary coil 9B. The first turn-off edge signal E then generates a voltage between a source and a drain (hereinafter referred to as "between the S and G") of the FET 25 via the PN diode 27, thereby turning on the FET 25. When the FET 25 is turned on, the gate accumulation charge of the first synchronous rectifier 11 is instantaneously discharged (refer to (13) in FIG. 3), thereby turning off the first synchronous rectifier 11. By applying the first turn-off edge signal E between the S and G of the FET 25 via the PN diode 27, the ON state of the FET 25 can be maintained for a period of time longer than the pulse width of the first turn-off edge signal E (refer to (12) in FIG. 3). The gate accumulation charge of the FET 25 is gradually discharged via the resistor 28 and the diode 26.

The zener diode 29 is provided in order to rapidly discharge the gate accumulation charge of the FET 25 when the first turn-on edge signal F having a reverse polarity is generated. If the zener voltage of the zener diode 29 is less than the sum of the threshold voltages of the FET 24 and the FET 25, a shoot-through current is not generated when the FET 24 and the FET 25 are simultaneously turned on. With an increase in an amount of charge of the capacitor 22, the amplitude of the first turn-off edge signal E decreases. When the voltage of the capacitor 22 exceeds the voltage of the primary-side control circuit power input unit 16 and if the SBD 19 becomes conductive, a voltage corresponding to a voltage drop of the SBD 19 in a forward direction occurs in the primary coil 9A (refer to (3) in FIG. 3). The voltage corresponding to a voltage drop of the SBD 19 in a forward direction has a polarity opposite to that of the first turn-off edge signal E. When the first turn-off edge signal E is generated, the excitation energy accumulated in the first pulse transformer is discharged. Since the SBD 19 has a voltage drop in the forward direction less than that of the PN diode 26 connected to the secondary coil 9B, the voltage corresponding to a voltage drop of the SBD 19 in a forward direction does not occur between the G and S of the FET 24. Accordingly, malfunctions do not occur.

When the first PWM signal rises (refer to (1) in FIG. 3), the accumulation charge of the capacitor 22 is discharged through the primary coil 9A of the first pulse transformer (refer to (2) in FIG. 3) and, therefore, the first turn-on edge signal F is generated (refer to (3) in FIG. 3). The first turn-on edge signal F is transmitted from the primary coil 9A to the secondary coil 9B. The first turn-on edge signal F generates a voltage between the G and S of the FET 24 via the PN diode 26 (refer to (11) in FIG. 3), thereby turning on the FET 24. When the FET 24 is turned on, the gate of the first synchronous rectifier 11 is gradually charged via the resistor 23 (refer to (13) in FIG. 3), thereby turning on the first synchronous rectifier 11. By applying the first turn-on edge signal F between the G and S of the FET 24 via the PN diode 26, the ON state of the FET 24 can be maintained for a period of time longer than the pulse width of the first turn-on edge signal F (refer to (11) in FIG. 3). The gate accumulation charge of the FET 24 is gradually discharged via the resistor 28 and the diode 27.

When the first turn-off edge signal E having an opposite polarity is generated, the zener diode 29 rapidly discharges the gate accumulation charge of the FET 24. With a decrease in the charge of the capacitor 22, the amplitude of the first turn-on edge signal F decreases. When the voltage of the capacitor 22 is decreased to a value less than the ground potential and if the SBD 20 becomes conductive, a voltage corresponding to a voltage drop of the SBD 20 in a forward direction appears in the primary coil 9A (refer to (3) in FIG. 3). The voltage corresponding to a voltage drop of the SBD 20 in a forward direction has a polarity opposite to that of the first turn-on edge signal F. When the first turn-on edge signal F is generated, the excitation energy accumulated in the first pulse transformer is discharged. Since the SBD 20 has a voltage drop in the forward direction less than that of the PN diode 27 connected to the secondary coil 9B, the voltage corresponding to a voltage drop of the SBD 20 in a forward direction does not occur between the S and G of the FET 25. Accordingly, malfunction does not occur.

Individual components of the high side driver 3 have propagation delays specific to the components (e.g., several tens of ns to several hundreds of ns). Accordingly, the phase of the output signal is delayed from the phase of the input signal. During a time period from generation of the first PWM signal to the rise of the gate drive signal of the first power switch 4, a delay corresponding to a first delay time I occurs. In addition, during a time period from generation of the second PWM signal to the rise of the gate drive signal of the second power switch 5, a delay corresponding to a second delay time J occurs. Similarly, a propagation delay occurs when the gate of the power switch is turned off. When the first synchronous rectifier 11 is turned off, the first turn-off edge signal E is generated earlier than the rise of the G-S voltage of the first power switch 4 by the delay time I. Accordingly, the turn-off timing of the first synchronous rectifier 11 is earlier than the turn-on timing of the first power switch 4. As a result, a short circuit current is not generated.

In contrast, when the first synchronous rectifier 11 is turned on, the first turn-on edge signal F is generated earlier than the rise of the G-S voltage of the first power switch 4. Accordingly, if no actions are taken, turn-on is performed too early, and thus, a short circuit current is generated. Therefore, the gate charging speed of the first synchronous rectifier 11 is restricted by using the resistor 23 so that turn-on of the first synchronous rectifier 11 is delayed by a third delay time K. In this manner, the occurrence of a short circuit current is prevented.

Through the above-described operations, the first synchronous rectifier 11 is driven with timing substantially complementary to that of the operation of the first power switch 4.

Since the operation between the second power switch 5 and the second synchronous rectifier 12 is similar to the operation between the first power switch 4 and the first synchronous rectifier 11, descriptions thereof are not repeated. The second turn-off edge signal G generated when the second PWM signal output from the terminal 2B of the PWM control circuit 2 rises and the turn-on edge signal H generated when the second PWM signal falls are transmitted from the primary side circuit to the secondary side circuit of the second pulse transformer 10. Thus, by turning on and off the FET 36 and the FET 35, the second synchronous rectifier 12 is driven with timing substantially complementary to that of the operation of the power switch 5.

In the half bridge converter according to the first preferred embodiment, the first power switch 4 and the second power switch 5 are driven with timing substantially complementary to that of the operation of the first synchronous rectifier 11 and the second synchronous rectifier 12. Accordingly, a period of time during which the current output from the secondary coil of the main transformer 8 flows to the parasitic diode of the synchronous rectifier is eliminated. In addition, a short circuit current due to a timing shift for driving the synchronous rectifier is not generated. As a result, a highly efficient power conversion operation can be provided.

FIGS. 4A to 4D are diagrams illustrating the structure of a composite transformer in which the main transformer 8, the first pulse transformer 9, and the second pulse transformer 10 are integrated into one transformer.

Since the first pulse transformer 9 and the second pulse transformer 10 transmit a pulse edge signal instead of a switching frequency signal, each of the first pulse transformer 9 and the second pulse transformer 10 only needs to have a low inductance of, for example, several µH. Accordingly, if each of the first pulse transformer 9 and the second pulse transformer 10 has a closed magnetic loop core, the first pulse transformer 9 and the second pulse transformer 10 can be defined by only one turn or two turns. The composite transformer includes the main transformer 8, the first pulse transformer 9, and the second pulse transformer 10, each including a pair of cores and an independent coil.

Figure 4A:
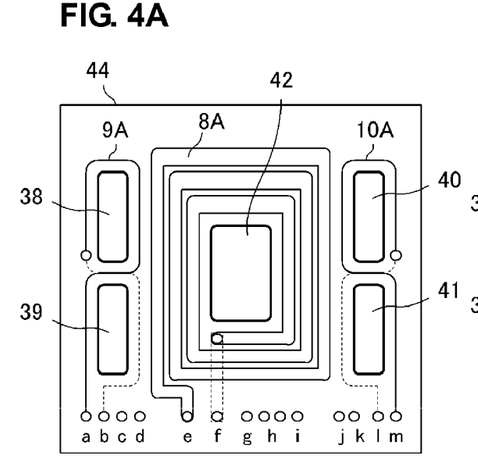
FIGS. 4A to 4D are diagrams illustrating the structure of a composite transformer used in the double-ended isolated DC-DC converter according to the first preferred embodiment of the present invention.
Figure 4B:
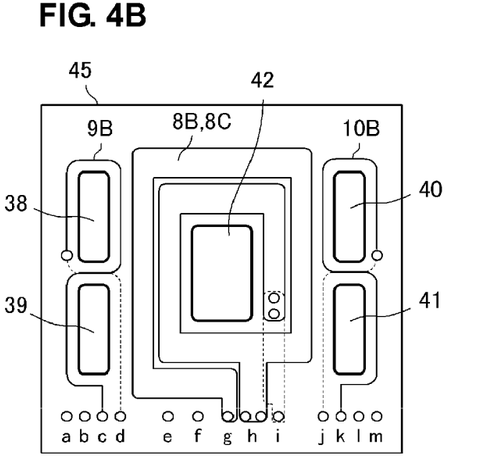
Figure 4C:
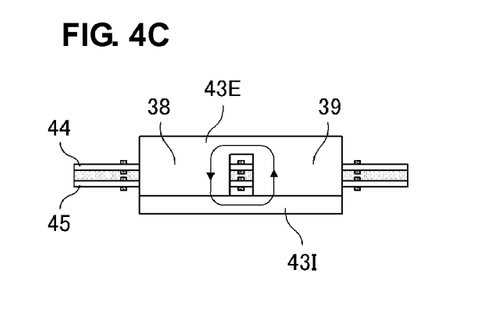
Figure 4D:
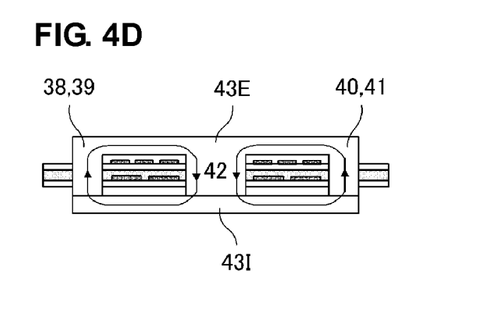

FIGS. 4A and 4B are plan views illustrating coil patterns disposed on a transformer substrate. FIGS. 4C and 4D are cross-sectional views at a predetermined location of the composite transformer.

As shown in FIGS. 4A to 4D, a closed magnetic circuit is provided by surrounding printed circuit boards 44 and 45 with an I-E core formed by combining an E-shaped core 43E and a planar plate core 43I so as to join the printed circuit board 44 to the printed circuit board 45. The E-shaped core 43E includes five leg portions 38, 39, 40, 41, and 42. In FIGS. 4A to 4D, the leg portion 38 defines a first outer leg. The leg portion 39 defines a second outer leg. The leg portion 40 defines a third outer leg. The leg portion 41 defines a fourth outer leg. The leg portion 42 defines a middle leg. The leg portions 38, 39, 40, 41, and 42 pass through first to fourth outer holes and a middle hole of the printed circuit boards 44 and 45, respectively.

Each of the circuit boards is a 4-layer multilayer board. The 4-layer multilayer board is formed by stacking a double-sided board 44 for first and second layers and a double-sided board 45 for third and fourth layers with a prepreg therebetween. The printed circuit boards 44 and 45 include through-holes a to m, which define input and output terminals of the transformers. The printed circuit boards 44 and 45 further include conductor patterns of the primary coil 8A and the secondary coil 8B, 8C of the main transformer 8. The conductor patterns are configured so as to be wound around the middle leg 42 of the core in a spiral manner. More specifically, the primary coil 8A is wound three times between the input and output terminals e and f. The secondary coil 8B, 8C is wound once between the input and output terminals c and d with the middle tap h.

Each of the primary coil 9A and the secondary coil 9B of the first pulse transformer 9 includes a coil wound around the first outer leg 38 and a coil wound around the second outer leg 39 for the same number of turns in opposite directions. The two included coils are connected in series. More specifically, the primary coil 9A is wound once between the input and output terminals a and b of the double-sided board 44. The secondary coil 9B is wound once between the input and output terminals c and d of the double-sided board 45.

Each of the primary coil 10A and the secondary coil 10B of the second pulse transformer 10 includes a coil wound around the third outer leg 40 and a coil wound around the fourth outer leg 41 for the same or substantially the same number of turns in opposite directions. The two included coils are connected in series. More specifically, the primary coil 10A is wound once between the input and output terminals l and m of the double-sided board 44. The secondary coil 10B is wound once between the input and output terminals j and k of the double-sided board 45.

Such a structure provides a composite transformer with negligible degradation of the characteristic of the main transformer. This structure can advantageously provide reduction in size and manufacturing cost of the converter.

Second Preferred Embodiment

Figure 5:
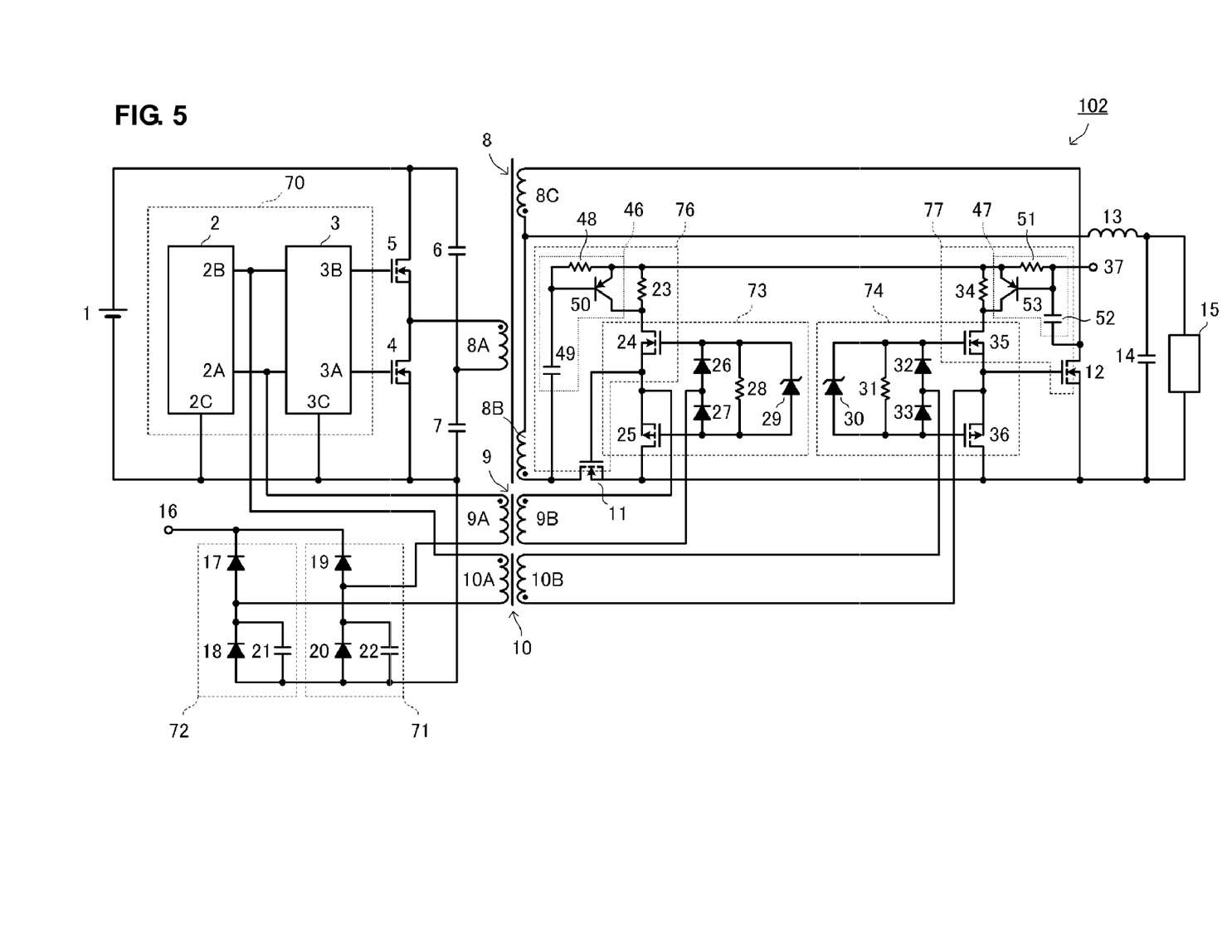
FIG. 5 is a circuit diagram of a double-ended isolated DC-DC converter according to a second preferred embodiment of the present invention.

FIG. 5 is a circuit diagram of a double-ended isolated DC-DC converter according to a second preferred embodiment of the present invention. The double-ended isolated DC-DC converter has a basic structure similar to that of the first preferred embodiment.

However, as shown in FIG. 5, a double-ended isolated DC-DC converter 102 includes a first synchronous rectifier side delay circuit 76 and a second synchronous rectifier side delay circuit 77 having a structure different from that illustrated in FIG. 2. In the preferred embodiment shown in FIG. 2, a gate charging current of the first synchronous rectifier 11 and the second synchronous rectifier 12 is restricted by the resistors 23 and 34 so that the turn-on timing points of the first synchronous rectifier 11 and the second synchronous rectifier 12 are delayed by third and fourth delay times K and L, respectively. Thus, the occurrence of a short-circuit current is prevented. However, due to variation in the input capacitance of the synchronous rectifiers 11 and 12, the turn-on timing point may be shifted from the optimal timing point. In addition, the optimal turn-on timing point varies in accordance with the load current. When the load current is high, it is preferable that the turn-on timing point be slightly advanced.

The first synchronous rectifier side delay circuit 76 includes a delay time control circuit 46. The delay time control circuit 46 includes a PNP transistor 50, resistors 23 and 48, and a capacitor 49. In the delay time control circuit 46, variation in a drain voltage of the first synchronous rectifier 11 is monitored by a differentiating circuit including the resistor 48 and the capacitor 49. When the differentiating circuit detects a drop of the drain voltage of the first synchronous rectifier 11, the first delay time control circuit 46 turns on the PNP transistor 50 and stops (completes) the delaying operation.

Similarly, the second synchronous rectifier side delay circuit 77 includes a delay time control circuit 47. The delay time control circuit 47 includes a PNP transistor 53, resistors 34 and 51, and a capacitor 52. In the delay time control circuit 47, variation in a drain voltage of the second synchronous rectifier 12 is monitored by a differentiating circuit including the resistor 51 and the capacitor 52. When the differentiating circuit detects a drop of the drain voltage of the second synchronous rectifier 12, the delay time control circuit 47 turns on the PNP transistor 53 and stops (completes) the delaying operation.

That is, when detecting variations in the drain voltages of the first synchronous rectifier 11 and the second synchronous rectifier 12 after receiving the first turn-on edge signal F and the second turn-on edge signal H, the first synchronous rectifier 11 and the second synchronous rectifier 12 are turned on, respectively. Through such an operation, the turn-on timing is adjusted. In this manner, even when parameters of components are not the same or variations in the load current occur, the optimal turn-on timing of the synchronous rectifier can be maintained at all times.

In the method in which the first synchronous rectifier 11 and the second synchronous rectifier 12 are turned on or off by detecting variations in the drain voltages of the first synchronous rectifier 11 and the second synchronous rectifier 12, the synchronous rectifiers self-oscillate immediately after the switching operations of the first power switch 4 and the second power switch 5 are stopped. Sometimes, an excess voltage/current stress is applied to portions of the converter. However, according to the second preferred embodiment, the first synchronous rectifier 11 and the second synchronous rectifier 12 are turned on based on a logical AND condition of reception of a turn-on edge signal via the first pulse transformer 9 and the second pulse transformer 10 and detection of variations in the drain voltage of the synchronous rectifier. Accordingly, when the first power switch 4 and the second power switch 5 are stopped, a turn-on edge signal disappears, and therefore, the synchronous rectifiers are not turned on. Consequently, the synchronous rectifiers do not self-oscillate, and therefore, an excess voltage/current stress is not applied to portions of the converter.

While the second preferred embodiment has been described with reference to the method preferably using detection of variations in the drain voltages of the first synchronous rectifier 11 and the second synchronous rectifier 12, a method using detection of variation in the coil voltage of the main transformer 8 or variations in the voltage of the choke coil 13 may also be used.

Generally, in converters using a synchronous rectifier, a back-flow operation mode occurs in which an electrical current back-flows from the output to the input of the converter during the switching operations of the first power switch 4 and the second power switch 5. In the back-flow operation mode, an electrical current back-flows from the sources to the drains of the first power switch 4 and the second power switch 5. In such a case, even when the gates of the first power switch 4 and the second power switch 5 are turned off, the drain voltages are not instantaneously increased. That is, even when the secondary side circuit receives the first turn-on edge signal F and the second turn-on edge signal H, the drain voltages of the first and second synchronous rectifiers are not instantaneously changed. However, if large adjustment ranges of the first delay time control circuit 46 and the second delay time control circuit 47 are set, the turn-on timing points of the first synchronous rectifier 11 and the second synchronous rectifier 12 are delayed until the drain voltages of the first synchronous rectifier 11 and the second synchronous rectifier 12 are dropped. Accordingly, an increase in the back-flow current is automatically restricted. That is, a back-flow current self-restricting function can be provided by the first delay time control circuit 46 and the second delay time control circuit 47.

Third Preferred Embodiment

Figure 6:
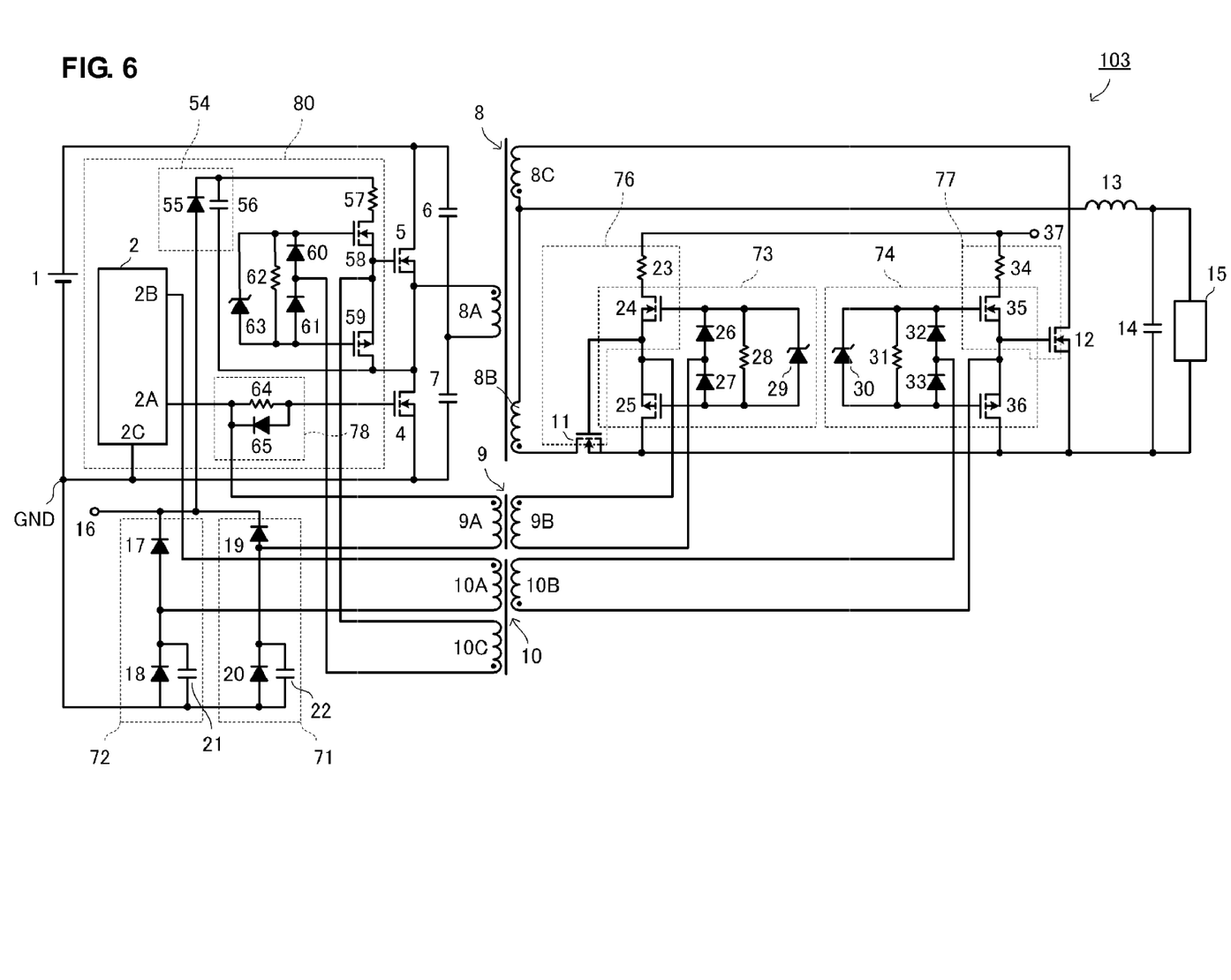
FIG. 6 is a circuit diagram of a double-ended isolated DC-DC converter according to a third preferred embodiment of the present invention.

FIG. 6 is a circuit diagram of a double-ended isolated DC-DC converter according to a third preferred embodiment of the present invention.

In order to reduce a manufacturing cost, a double-ended isolated DC-DC converter 103 does not include the high side driver 3 shown in FIG. 2. Accordingly, the second power switch 5 having a reference potential (source) that is disconnected from the ground is driven using the second pulse transformer 10.

As shown in FIG. 6, in order to obtain driving power of the second power switch 5, a bootstrap circuit 54 including a capacitor 56 and a diode 55 is provided. A series circuit of an FET 58, an FET 59, and a resistor 57 is connected between an output unit of the bootstrap circuit 54 and the ground on a primary side. A connection point between the FET 58 and the FET 59 is connected to the gate of the second power switch 5. A circuit of diodes 60 and 61, a zener diode 63, and a resistor 62 is connected to the gates of the FET 58 and the FET 59. A tertiary coil 10C of the second pulse transformer 10 is connected between a connection point between the diodes 60 and 61 and the connection point between the FETs 58 and 59.

In addition, a first power switch side delay circuit 78 including a resistor 64 and an SBD 65 is provided between the first PWM signal output terminal 2A of the PWM control circuit 2 and the gate of the first power switch 4.

The double-ended isolated DC-DC converter 103 performs the following operation.

First, a second turn-off edge signal G output from the tertiary coil 10C of the second pulse transformer 10 is applied to the gate of the FET 58 via the PN diode 60. Thus, the FET 58 is turned on. Electrical charge is accumulated in the gate of the second power switch 5, and therefore, the second power switch 5 is turned on. Subsequently, the second turn-on edge signal H is applied to the gate of the FET 59 via the PN diode 61. Thus, the FET 59 is turned on. The electrical charge in the gate of the second power switch 5 is discharged, and therefore, the second power switch 5 is turned off.

In accordance with the polarity of the second pulse transformer 10, the second power switch 5 is driven at the same timing as the second PWM signal output from the PWM control circuit 2. In addition, the second synchronous rectifier 12 is driven at a timing opposite to that of the second PWM signal. Accordingly, the second power switch 5 and the second synchronous rectifier 12 are driven with substantially complementary timing. Similarly, the first power switch 4 and the first synchronous rectifier 11 are driven with substantially complementary timing.

Note that a charging current of the gate of the second power switch 5 is restricted by the resistor 57. Accordingly, the second delay time J can be ensured. In addition, a charging current of the gate of the first power switch 4 is restricted by the power switch side delay circuit 78. Accordingly, the first delay time I can be ensured.

The other structures and operations are substantially the same as those of the first preferred embodiment shown in FIGS. 2 and 3.

Fourth Preferred Embodiment

Figure 7:
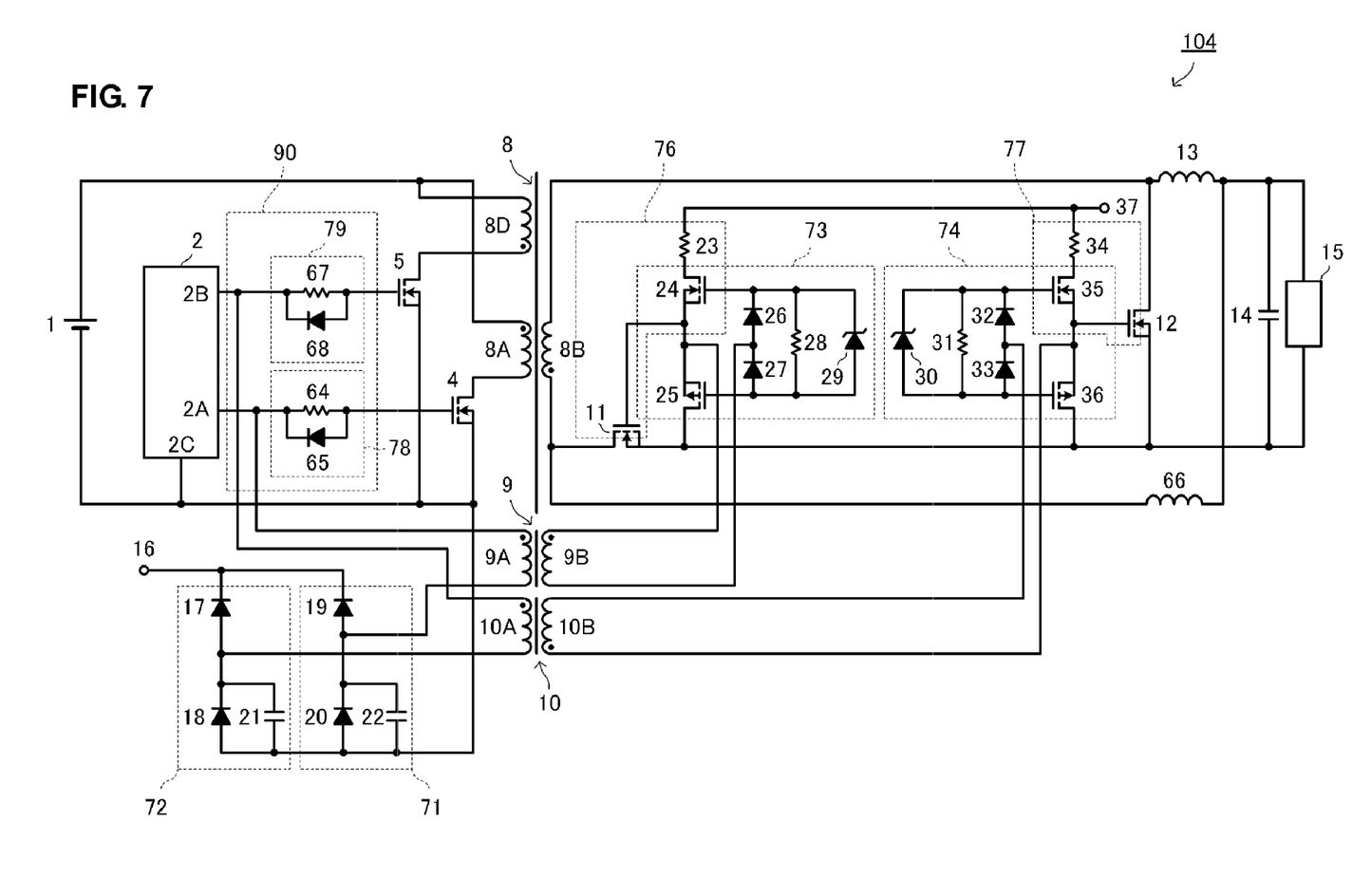
FIG. 7 is a circuit diagram of a double-ended isolated DC-DC converter according to a fourth preferred embodiment of the present invention.

FIG. 7 is a circuit diagram of a double-ended isolated DC-DC converter according to a fourth preferred embodiment of the present invention. The double-ended isolated DC-DC converter has a basic structure similar to that of the first preferred embodiment.

According to the fourth preferred embodiment, a circuit topology different from those of the first to third preferred embodiments is provided. In the first to third preferred embodiments, a half-bridge converter is provided. However, the double-ended isolated DC-DC converter according to the fourth preferred embodiment is arranged as a push-pull converter for power conversion, and the double-ended isolated DC-DC converter includes a rectifier having a current doubler rectifier circuit format which is suitable to output a low voltage.

The main transformer 8 includes a second primary coil 8D in addition to a first primary coil 8A. The second power switch 5 is connected to the second primary coil 8D.

A primary side control circuit 90 includes a first power switch side delay circuit 78 having the resistor 64 and the SBD 65 and a second power switch side delay circuit 79 having a resistor 67 and an SBD 68. The first power switch side delay circuit 78 is disposed between the first PWM signal output terminal 2A of the PWM control circuit 2 and the gate of the first power switch 4. In addition, the second power switch side delay circuit 79 is disposed between the second PWM signal output terminal 2B of the PWM control circuit 2 and the gate of the second power switch 5.

The double-ended isolated DC-DC converter 104 performs the following operation.

First, when a DC voltage is applied from the input DC power supply 1, the first power switch 4 and the second power switch 5 alternately perform a switching operation so that direct current power is converted to alternating current power. The alternating current power is transferred from the primary side circuit to the secondary side circuit by the main transformer 8. The alternating current power is then rectified by the first synchronous rectifier 11 and the second synchronous rectifier 12. Thereafter, the alternating current power is smoothed by the choke coil 13, a choke coil 66, and the output smoothing capacitor 14 and is converted into a direct current again. Finally, the direct current is supplied to the load 15.

The duties of the first power switch 4 and the second power switch 5 are substantially the same. As the duty of the first power switch 4 is decreased, the duty of the second power switch 5 is also decreased. The first power switch 4 and the first synchronous rectifier 11 are driven at a substantially complementary manner. In addition, the second power switch 5 and the second synchronous rectifier 12 are operated in a substantially complementary manner.

Unlike the first preferred embodiment, the fourth preferred embodiment does not use a high side driver that has a specific propagation delay. Accordingly, by using the resistor 64 and the SBD 65 of the power switch side delay circuit 78 so as to restrict a charging current of the gate of the first power switch 4, the first delay time I can be ensured. In addition, by using the resistor 67 and the SBD 68 of the second power switch side delay circuit 79 so as to restrict a charging current of the gate of the second power switch 5, the second delay time J can be ensured.

The other structures and operations are substantially the same as those of the first preferred embodiment shown in FIGS. 2 and 3.

While the present invention has been described with reference to the first to fourth preferred embodiments, it is to be understood that a variety of applications other than the first to fourth preferred embodiments can be provided. Examples of the other power conversion circuit topologies include a full-bridge converter. In addition, a circuit configuration other than those of the first to fourth preferred embodiments can be used for the circuit that receives the turn-on edge signal and the turn-off edge signal and drives the synchronous rectifier. For example, if an operation in which the FET 24 and the FET 25 are not simultaneously turned on is available by adjusting the coefficient of the resistor 28, the need for the zener diode 29 can be eliminated. Similarly, if an operation in which the FET 35 and the FET 36 are not simultaneously turned on is available by adjusting the coefficient of the resistor 31, the need for the zener diode 30 can be eliminated. Furthermore, a composite transformer having a shape other than the shape shown in FIGS. 4A to 4D can be provided. Still furthermore, even if the main transformer 8 is separated from the first pulse transformer 9 and the second pulse transformer 10, the circuits can operate without any problems.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A double-ended isolated DC-DC converter comprising:
   a main transformer including at least a primary coil and a secondary coil;
   first and second power switches connected to a primary side of the main transformer;
   a primary side control circuit arranged to control switching operations of the first and second power switches;
   first and second synchronous rectifiers connected to a secondary side of the main transformer;
   at least one choke coil;
   a first edge signal generating circuit arranged to generate, based a signal output from the primary side control circuit, a first turn-off edge signal and a first turn-on edge signal substantially corresponding to a timing of turn-on and turn-off of the first power switch, respectively;
   a second edge signal generating circuit arranged to generate, based on a signal output from the primary side control circuit, a second turn-off edge signal and a second turn-on edge signal substantially corresponding to a timing of turn-on and turn-off of the second power switch, respectively;
   a first pulse transformer arranged to transmit the first turn-off edge signal and the first turn-on edge signal to the secondary side;
   a second pulse transformer arranged to transmit the second turn-off edge signal and the second turn-on edge signal to the secondary side;
   a first synchronous rectifier control circuit arranged to turn off the first synchronous rectifier in response to the first turn-off edge signal transmitted from the first pulse transformer and turn on the first synchronous rectifier in response to the first turn-on edge signal transmitted from the first pulse transformer; and
   a second synchronous rectifier control circuit arranged to turn off the second synchronous rectifier in response to the second turn-off edge signal transmitted from the second pulse transformer and turn on the second synchronous rectifier in response to the second turn-on edge signal transmitted from the second pulse transformer; wherein
   the first power switch and the first synchronous rectifier are driven with substantially complementary timing; and
   the second power switch and the second synchronous rectifier are driven with substantially complementary timing.

2. The double-ended isolated DC-DC converter according to claim 1, wherein the primary side control circuit has a delaying characteristic so that turn-on of the first power switch lags behind turn-off of the first synchronous rectifier after the first turn-off edge signal is generated, and turn-on of the second power switch lags behind turn-off of the second synchronous rectifier after the second turn-off edge signal is generated.

3. The double-ended isolated DC-DC converter according to claim 1, further comprising:
   a first synchronous rectifier side delay circuit arranged to cause turn-on of the first synchronous rectifier to lag behind turn-off of the first power switch after the first turn-on edge signal is generated; and
   a second synchronous rectifier side delay circuit arranged to cause turn-on of the second synchronous rectifier to lag behind turn-off of the second power switch after the first turn-on edge signal is generated.

4. The double-ended isolated DC-DC converter according to claim 3, wherein
   the first synchronous rectifier side delay circuit includes a first delay time control circuit arranged to detect variations in at least one of a drain voltage of the first synchronous rectifier, a coil voltage of the main transformer, and a voltage of the choke coil and stop the delaying operation when the drain voltage of the first synchronous rectifier is changed; and
   the second synchronous rectifier side delay circuit includes a second delay time control circuit arranged to detect variation in at least one of a drain voltage of the second synchronous rectifier, a coil voltage of the main transformer, and a voltage of the choke coil and stop the delaying operation when the drain voltage of the second synchronous rectifier is changed.

5. The double-ended isolated DC-DC converter according to claim 1, wherein
   the second power switch is a high side switch having a reference potential disconnected from the ground; and
   the primary side control circuit includes a circuit arranged to turn on the second power switch in response to the second turn-off edge signal and turn off the second power switch in response to the second turn-on edge signal.

6. The double-ended isolated DC-DC converter according to claim 1, wherein the main transformer and the first and second pulse transformers include a pair of cores and coils independent from each other so as to define a composite transformer that equivalently functions as individual independent transformers.

7. The double-ended isolated DC-DC converter according to claim 6, wherein
   the pair of cores includes a middle leg and at least one pair of outer legs facing each other with the middle leg disposed therebetween so as to define a closed magnetic circuit;

the coils include a first coil set including at least two coils wound around the middle leg, a second coil set including two coils, where one of the pair of outer legs is separated into two outer leg portions with a space therebetween that allows a coil to be wired therein and each of the two coils is wound around the corresponding one of the two outer leg portions in opposite winding directions, and a third coil set including two coils, where the other outer leg is separated into two outer leg portions with a space therebetween that allows a coil to be wired and each of the two coils is wound around the corresponding one of the two outer leg portions in opposite winding directions; and the first coil set and the pair of cores define the main transformer, the second coil set and the pair of cores define the first pulse transformer, and the third core set and the pair of cores define the second pulse transformer.

* * * * *